United States Patent [19]
Liu et al.

[11] Patent Number: 5,668,972
[45] Date of Patent: Sep. 16, 1997

[54] METHOD AND SYSTEM FOR EFFICIENT MISS SEQUENCE CACHE LINE ALLOCATION UTILIZING AN ALLOCATION CONTROL CELL STATE TO ENABLE A SELECTED MATCH LINE

[75] Inventors: Peichun Peter Liu; Brian David Branson, both of Austin, Tex.

[73] Assignee: International Business Machines Corporation, Armonk, N.Y.

[21] Appl. No.: 319,202

[22] Filed: Oct. 5, 1994

[51] Int. Cl.$^6$ .................................................. G06F 12/12
[52] U.S. Cl. ........................ 711/136; 711/108; 711/118
[58] Field of Search ................................... 395/454, 435, 395/445, 455, 460, 463, 486, 487

[56] References Cited

U.S. PATENT DOCUMENTS

| | | | |
|---|---|---|---|
| 4,404,653 | 9/1983 | Ruhman et al. | 365/49 |
| 4,532,606 | 7/1985 | Phelps | 365/49 |
| 4,538,241 | 8/1985 | Levin et al. | 395/417 |
| 4,538,243 | 8/1985 | Zehner | 365/49 |
| 4,758,982 | 7/1988 | Price | 395/435 |
| 4,791,606 | 12/1988 | Threewitt et al. | 365/49 |
| 4,799,192 | 1/1989 | Wade et al. | 365/49 |
| 4,831,585 | 5/1989 | Wade et al. | 365/49 |
| 4,858,180 | 8/1989 | Murdoch | 365/49 |
| 4,894,799 | 1/1990 | Hanawa et al. | 365/49 |
| 4,965,767 | 10/1990 | Kinoshita et al. | 365/49 |
| 4,991,081 | 2/1991 | Bosshart | 395/403 |
| 4,991,136 | 2/1991 | Mihara | 365/49 |
| 5,051,949 | 9/1991 | Young | 365/49 |
| 5,126,968 | 6/1992 | Hamamoto et al. | 365/49 |
| 5,218,687 | 6/1993 | Ducousso et al. | 395/455 |
| 5,226,005 | 7/1993 | Lee et al. | 365/49 |
| 5,267,190 | 11/1993 | Easley et al. | 365/49 |
| 5,299,147 | 3/1994 | Holst | 364/49 |
| 5,359,564 | 10/1994 | Liu et al. | 365/49 |

FOREIGN PATENT DOCUMENTS 0 560 598 A1 10/1993 European Pat. Off. .

OTHER PUBLICATIONS

Hiroshi Kadota, Jiro Miyake, Ichiro Okabayashi, Toshinori Maeda, Tadashi Okamoto, Masaitsu Nakajima and Keiichi Kagawa, "A 32–bit CMOS Microprocessor with On–Chip Cache and TLB" *IEEE Journal of Solid–State Circuits*, pp. 800–807, No. 5, New York, Oct., 1987.

8107 IEEE Journal of Solid–State Circuits, "A ternary Content addressable Search Engine" Jon P. Wade and Charles G. Sodini, Aug. 24, 1989 pp. 1003–1013.

Jim Handy, "The Cache Memory Book", 1993, pp. 86 & 259.

*Primary Examiner*—Eddie P. Chan
*Assistant Examiner*—Kevin L. Ellis
*Attorney, Agent, or Firm*—Michael A. Davis, Jr.; Andrew J. Dillon

[57] ABSTRACT

A data cache array which includes a plurality of cache lines wherein each cache line includes a selected block of data, a parity field, a content addressable field containing at least a portion of an address for that block of information and a data status field for providing an indication of data validity within that cache line. An allocation control cell is associated with each cache line and a pseudo least recently utilized (PLRU) logic circuit is provided within the data cache array for each group of cache lines. The pseudo least recently utilized (PLRU) logic circuit is then utilized to select and set a particular allocation control cell within each group of cache lines in response to utilization of those cache lines. The cache line allocation process is then utilized to select a particular cache line within a group of cache lines for replacement in response to either an indication of invalidity of the block of information within that cache line or in response to the state of the pseudo least recently utilized (PLRU) logic circuit for that group of cache lines, if the block of information within every cache line within the group is indicated as valid.

10 Claims, 9 Drawing Sheets

METHOD AND SYSTEM FOR EFFICIENT MISS SEQUENCE CACHE LINE ALLOCATION UTILIZING AN ALLOCATION CONTROL CELL STATE TO ENABLE A SELECTED MATCH LINE

CROSS-REFERENCE TO RELATED APPLICATION

The present invention is related to the subject matter of U.S. patent application Ser. No. 08/173,448, filed Dec. 22, 1993, now abandoned in favor of continuation Ser. No. 08/658,913 and assigned to the assignee herein named. The content of the aforementioned U.S. patent application is hereby incorporated herein by reference thereto.

BACKGROUND OF THE INVENTION

1. Technical Field:

The present invention is directed to an improved data processing system and in particular to an improved data cache array for utilization in a data processing system. Still more particularly the present invention relates to an improved method and system for efficient miss sequence cache line allocation.

2. Description of the Related Art:

Many systems for processing information include both a system memory and a cache memory. A cache memory Is a relatively small, high-speed memory that stores a copy of information from one or more portions of the system memory. Frequently, the cache memory is physically distinct from the system memory. Such a cache memory can be integral with the processor device of the system or non-integral with the processor.

Information may be copied from a portion of the system memory into the cache memory. The information in the cache memory may then be modified. Further, modified information from the cache memory can then be copied back to a portion of the system memory. Accordingly, it is important to map information in the cache memory relative to its location within system memory.

Attempted access of data within the cache memory often achieves a success rate of greater than ninety percent; however, if the attempted access of data is unsuccessful, the desired data must be located within system memory and written into the cache memory. While this process is relatively straightforward, the decision of what data to delete from the cache in order to write the desired data into the cache is non-trivial in nature.

Prior art cache systems often utilize a separate tracking array which implements a "Least Recently Utilized" algorithm along with data validity indications so that the decision to replace a selected line of information may be made intelligently. While this technique works relatively well it involves an increase in bus routing and the number of cycles required to allocate a block of information for replacement within an associated cache.

Thus, it should be seen that a need exists for an improved method and system for efficient miss sequence cache line allocation wherein the replacement of blocks of information within a cache may be more efficiently accomplished.

SUMMARY OF THE INVENTION

It is therefore one object of the present invention to provide an improved data process system.

It is another object of the present invention to provide an improved data cache array for utilization with a data processing system.

It is yet another object of the present invention to provide an improved method and system for efficient miss sequence cache line allocation.

The foregoing objects are achieved as is now described. A data cache array which includes a plurality of cache lines wherein each cache line includes a selected block of data, a parity field, a content addressable field containing at least a portion of an address for that block of information and a data status field for providing an indication of data validity within that cache line. An allocation control cell is associated with each cache line and a pseudo least recently utilized (PLRU) logic circuit is provided within the data cache array for each group of cache lines. The pseudo least recently utilized (PLRU) logic circuit is then utilized to select and set a particular allocation control cell within each group of cache lines in response to utilization of those cache lines. The cache line allocation process is then utilized to select a particular cache line within a group of cache lines for replacement in response to either an indication of invalidity of the block of information within that cache line or in response to the state of the pseudo least recently utilized (PLRU) logic circuit for that group of cache lines, if the block of information within every cache line within the group is indicated as valid.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
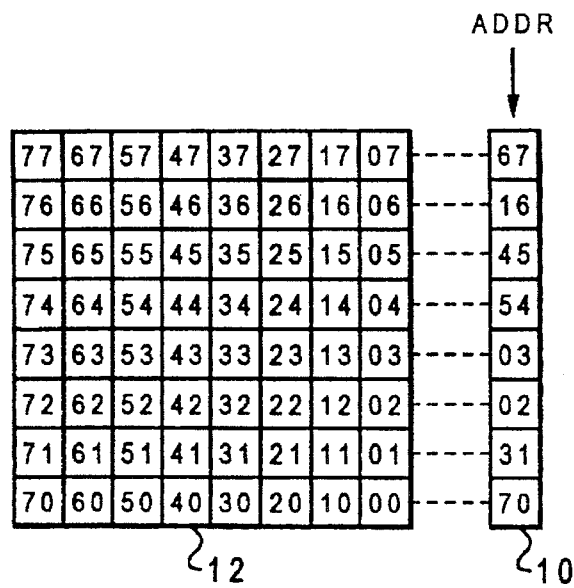
FIGS. 1a-1c are conceptual illustrations of exemplary mapping techniques for caching information according to the prior art.
Figure 1B:
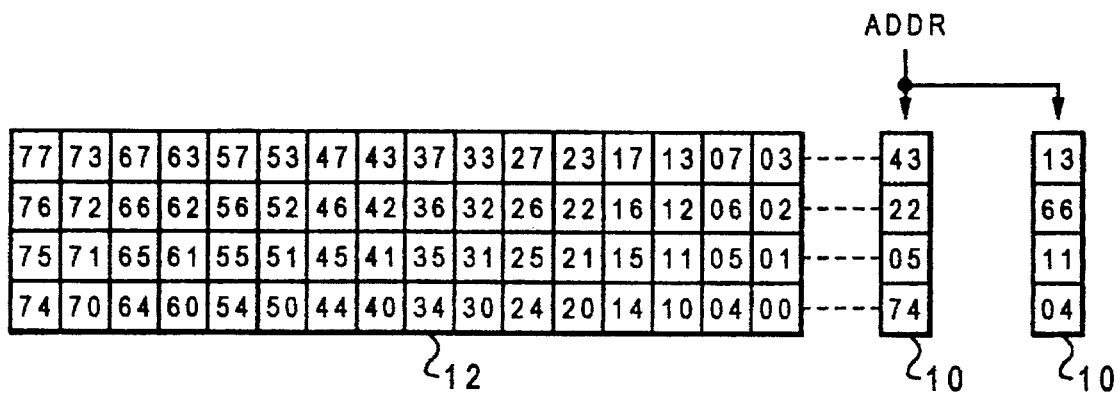
Figure 1C:
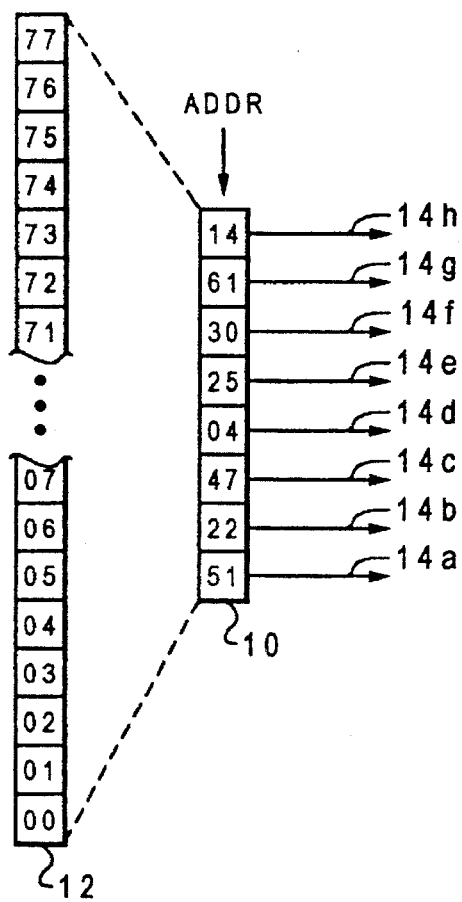

With reference now to the figures and in particular with reference to FIGS. 1a-1c, there are depicted conceptual illustrations of exemplary mapping techniques for caching information according to the prior art. A cache directory 10 has $p=2^k=8$ entries, each associated with a respective block of information within a cache memory. A matrix 12 has $q=2^{m+k}=64$ octal addresses, each representing a respective block of information within a secondary memory. FIGS. 1a–1c show each block of matrix 12 together with the block's respectively associated address. Each of the q octal addresses of matrix 12 has $m+k=6$ address bits.

FIG. 1a illustrates a direct mapping technique. In FIG. 1a, matrix 12 and directory 10 are logically arranged into $p=2^k=8$ congruence classes. A congruence class is specified by an address's low-order k address bits. Accordingly, each congruence class includes multiple addresses, all of which can share the same low-order k address bits. For FIG. 1a, $k=3$ and $m=3$.

For example, in FIG. 1a, one congruence class includes all addresses whose low-order 3 address bits are octal 7. This congruence class includes the octal address 07, 17, 27, 37, 47, 57, 67 and 77. Likewise, another congruence class includes the octal addresses 02, 12, 22, 32, 42, 52, 62 and 72.

In FIG. 1a, each congruence class has one respective preassigned associated entry within cache directory 10. Accordingly, at any single moment, the cache memory stores information for only a single address of a congruence class; this single address is specified in the congruence class's associated entry of cache directory 10. For example, in the congruence class's associated entry, cache directory 10 can store a tag including the single address's high-order m address bits. For FIG. 1a, $m=3$.

As an example, in FIG. 1a, from among the 8 addresses whose low-order three address bits are octal 5, cache directory 10 indicates that the cache memory stores information for only octal address 45 whose tag value is octal 4. Similarly, from among the eight addresses whose low-order address bits are octal 1, cache directory 10 indicates that the cache memory stores information for only octal address 31.

Accordingly, the low-order k address bits of an address ADDR specify the congruence class of ADDR. Moreover, the low-order k address bits operate as an index to access the congruence class's associated entry within cache directory 10 and its associated block of information within the cache memory by binary decoding. The indexed entry of cache directory 10 is read and compared with ADDR. If ADDR matches the index entry, then the index block of the cache memory stores information for ADDR.

A disadvantage of the directory mapping technique is that storage in the cache memory of one address's information excludes the storage of information for all other addresses of the same congruence class. This disadvantage is augmented by the fact that the number ($2^k$) of congruence classes is limited to the number ($2^k$) of entries in cache directory 10, so that a large number of addresses are forced to share a single entry in a cache directory 10. Likewise, all addresses of a single congruence class are forced to share a single entry in the cache memory.

FIG. 1b illustrates an n-way set-associative mapping technique, where $n=2$. In FIG. 1b, matrix 12 and directory 10 are logically arranged into $p/n=4$ congruence classes. A congruence class is specified, by an address's low-order y address bits, where $p/n=2^y$. Accordingly, each congruence class includes multiple addresses, all of which share the same low-order y address bits. For FIG. 1b, $k=3$ and $y=2$.

For example, in FIG. 1b, one congruence class includes all addresses whose low-order two address bits have a value=3. This congruence class includes the octal addresses 03, 07, 13, 17, 23, 27, 33, 37, 43, 47, 53, 57, 63, 67, 73 and 77. Likewise, another congruence class includes the octal addresses 01, 05, 11, 15, 21, 25, 31, 35, 41, 45, 51, 55, 61, 65, 71 and 75.

In FIG. 1b cache directory 10 is logically arranged into two columns having four blocks each. Thus, each congruence class has a respective preassigned associated set of first and second entries within cache directory 10. Accordingly, at any single moment, the cache memory stores information for first and second addresses of a congruence class; the first and second addresses are specified in the congruence class's associated set of first and second entries within cache directory 10. For example, in the first associated entry, cache directory 10 can store a first tag including the first address's high-order $m=1$ address bits; in the second associated entry, cache directory 10 can store a second tag including the second address's high-order $m=1$ address bits. For FIG. 1b, $m=3$.

As an example, in FIG. 1b, from among the 16 addresses whose low-order two address bits have a value=1, cache directory 10 indicates that the cache memory stores information for only octal address 05 and octal address 11. Similarly, from among the 16 address whose low-order two address bits have a value=3, cache directory 10 indicates that the cache memory stores information for only octal address 43 and octal address 614.

Accordingly, the low-order y address bits of address ADDR specify the congruence class of ADDR. Moreover, the low-order y address bits operate as an index to the congruence class's associated set of two entries within cache directory 10 and its associated set of two blocks within the cache memory. The two index entries of cache directory 10 are read and compared with ADDR. If ADDR matches one of the indexed entries, then the matching entry's associated block of the cache memory stores information for ADDR. A disadvantage of the set-associative technique is delayed selection of information output from a cache memory, resulting from selection between the two indexed entries of cache directory 10. This disadvantage is overcome by the method and system of the present invention.

Finally, FIG. 1c illustrates a fully associative mapping technique. In FIG. 1c, matrix 12 and directory 10 are not logically arranged into congruence classes. Accordingly, at any single moment, the cache memory can store information for any group of eight addresses; these eight addresses are specified in the eight entries of cache directory 10. For example, cache directory 10 can store eight tags, each including all bits of an address.

In FIG. 1c, cache directory 10 is structures as a content addressable memory (CAM) array of $p=8$ CAM entries by $m+k=6$ address bits. As a CAM array, cache directory 10 inputs address ADDR and compares it simultaneously with all address in the eight CAM entries. If ADDR matches any CAM entry∝s address, then a respective one of match lines 14a–h is asserted to directly select the cache memory block storing information for ADDR. Thus, cache directory 10 operates as a decoder and accessing mechanism for the cache memory.

A disadvantage of the fully associative technique is the expense, complexity and diminished speed of a CAM array having m+k address bit lines by p match lines. This is especially true as the number (m+k) of address bits increases in conjunction with the number of ($q=2^{m+k}$) of secondary memory blocks.

Figure 2:
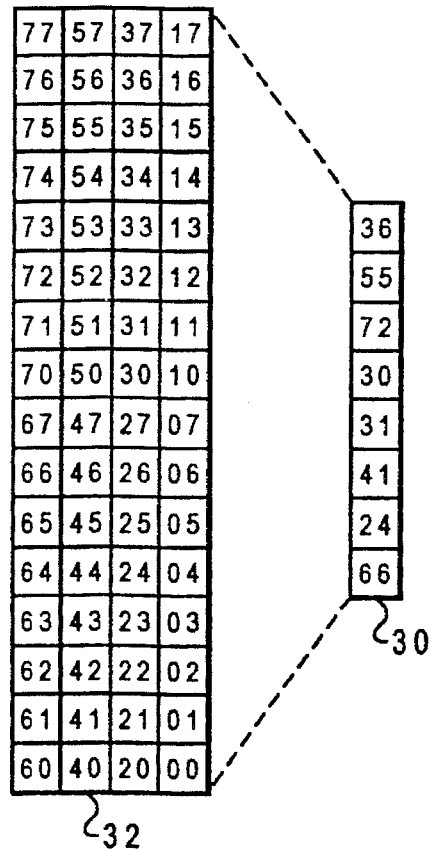
FIG. 2 is a conceptual illustration of a semi-associative mapping technique for caching information, in accordance with the preferred embodiment of the present invention.

Referring now to FIG. 2 there is depicted a conceptual illustration of a semi-associative mapping technique for caching information in accordance with the present invention. As illustrated, a cache directory 30 has $p=2^k=8$ entries (or "locations") each associated with a respective block (or location) of information within a cache memory provided in accordance with the present invention. Matrix 32 is depicted, which includes $q=2^{m+k}=64$ octal addresses, each representing a respective block (or "location") of information within a secondary memory, depicted within FIG. 3. Each of the q octal addresses of matrix 32 has $m+k=6$ address bits.

As illustrated in FIG. 2, matrix 32 and directory 30 are logically arranged into $2^{(k+j)}$ congruence classes, where $2^k$ is a number of primary congruence classes and $2^j$ is a number of secondary congruence classes ("congruence subclasses"). For FIG. 2, $p*2=2^{(k+j)}=16$, so that $k=3$ and $j=1$. A primary/secondary congruence class is specified by an addresses's index (k+j) address bits. Accordingly, each congruence class includes multiple addresses, all of which share the same index (k+j) address bits.

For example, in FIG. 2, one congruence class includes all addresses whose index (k+j) address bits are 0001. This congruence class includes the octal addresses 01, 21, 41 and 61. Likewise, another congruence class (whose index (k+j) address bits are 1001) includes the octal addresses 11, 31, 51 and 71.

In a significant aspect of the preferred embodiment, congruence classes are not preassigned to entries within cache directory 30. Instead, congruence classes are dynamically associated with (or "allocated to") entries within cache directory 30. Accordingly, each cache directory 30 entry is able to relate a cache memory block to any of the multiple secondary memory blocks in more than one congruence class.

Thus, at any single moment, up to $2^k$ of the $2^{k+j}$ congruence classes have respective associated entries within cache directory 30 in any grouping and in any order. Accordingly, at any single moment, the cache memory stores information for up to $2^k$ of the $2^{(k+j)}$ congruence classes in any grouping and in any order. The value of a congruence class is stored in the k+j CAM cells of the congruence classes's dynamically associated entry within cache directory 30. In a congruence classes's associated entry within cache directory 30, one of multiple addresses of the congruence class is specified. For example, in the congruence classes's associated entry, cache directory 30 can store a tag including the addresses's high-order (m–j) address bits. For FIG. 2, m=3.

As an example, in FIG. 2, from among the four addresses whose index (k+j) address bits are 1101 (octal addresses 15, 35, 55 and 75), cache directory 30 indicates that the cache memory stores information for octal address 55. In such a situation, the k+j index bits 1101 are stored in the CAM bits portion of the congruence classes's cache directory 30 entry, and a m–j tag bits are stored in the tag portion of the congruence classes's cache directory 30 entry. By comparison, cache directory 30 indicates that the cache memory stores information for none of the four addresses (octal addresses 03, 23, 43 and 63) whose index (k+j) address bits are 0011.

In an exemplary embodiment, a particular congruence class is allowed only one associated entry within cache directory 30, such that the cache directory is able to store information for only one address of the particular congruence class at a single moment. By comparison, in the preferred embodiment, a particular congruence class is allowed multiple associated entries within cache directory 30, in any grouping and in any order, such that the cache memory is able to store information for multiple addresses of the particular congruence class at any single moment in any grouping and in any order.

Figure 3:
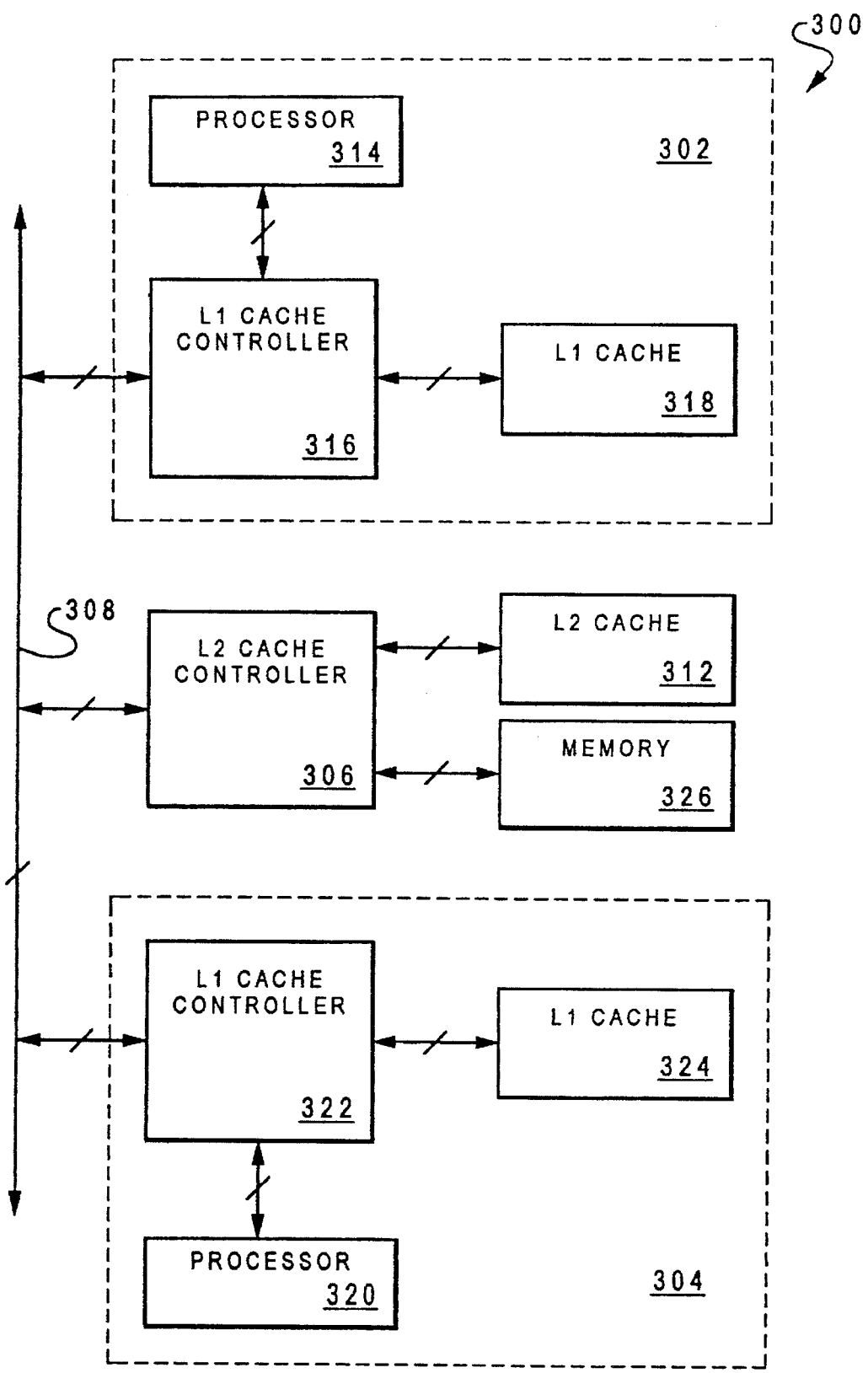
FIG. 3 is a block diagram of an exemplary system including first and second processing systems and a level 2 ("L2") cache memory.

With reference now to FIG. 3, there is depicted a block diagram of an exemplary system, indicated generally as 300, including first and second processing systems 302 and 304, and a level 2 ("L2") cache controller 306, connected to one another through a system bus 308. L2 cache controller 306 controls an L2 cache memory 312, according to a real 4-way set-associative mapping technique. L2 cache memory 312 is accessed in response to real addresses.

Processing system 302 preferably includes a processor 314, an L1 cache controller 316, and an L1 cache memory 318. L1 cache controller 316 is connected to system bus 308, to processor 314 and to L1 cache memory 318. L1 cache controller 316 controls L1 cache memory 318 according to the semi-associative mapping technique disclosed herein.

Likewise, a processing system 304 includes a processor 320, an L1 cache controller 322, and an L1 cache memory 324. L1 cache controller 322 is connected to system bus 308, to processor 320 and to L1 cache memory 324. L1 cache controller 322 controls L1 cache memory 324 according to the semi-associative mapping techniques set forth herein.

Processing system 302 is a representative one of processing systems 302 and 304. Notably, the set of blocks in L1 cache memory 318 is a subset of the blocks in L2 cache memory 312. Any block of information stored in L2 cache memory 312 likewise can be stored in L1 cache memory 318.

Accordingly, L2 cache memory 312 is preferably organized as a real-cache having a block size at least as large as the block size of L1 cache memory 318. If the number of blocks in L1 cache memory 318 is p, then any p blocks (out of the total number of blocks stored in L2 cache memory 312) may be stored in L1 cache memory 318. For multi-processor and I/O cache consistency, a directory of L2 cache memory 312 stores a real address for each block stored in L1 cache memory 318.

Aliasing in a system of the type set forth herein is supported on a page granularity, such that a real block of information may have different effective addresses. In an exemplary embodiment, the different effective addresses (corresponding to the same real block of information) may differ by an integral multiple of 4 kilobytes, which is the page size. As an example, if the size of L1 cache memory 318 is 32 kilobytes with a block size of 64 bytes, then L1 cache memory 318 has 512 blocks. In addition to the 64 bytes of information, each block has directory information including a real address and various status bits.

Thus, each of the 512 blocks of information in L1 cache memory 318 is associated with an effective address. A portion of the effective address is formed by bits $2^{12}$ through $2^c$ of each blocks' associated effective address. In the exemplary embodiment, c=19, and the effective address is either 32 bits or 64 bits in length. By searching L1 cache memory 318 in response to an effective address (EA) (see FIG. 4), one-cycle loads are achievable.

Figure 4:
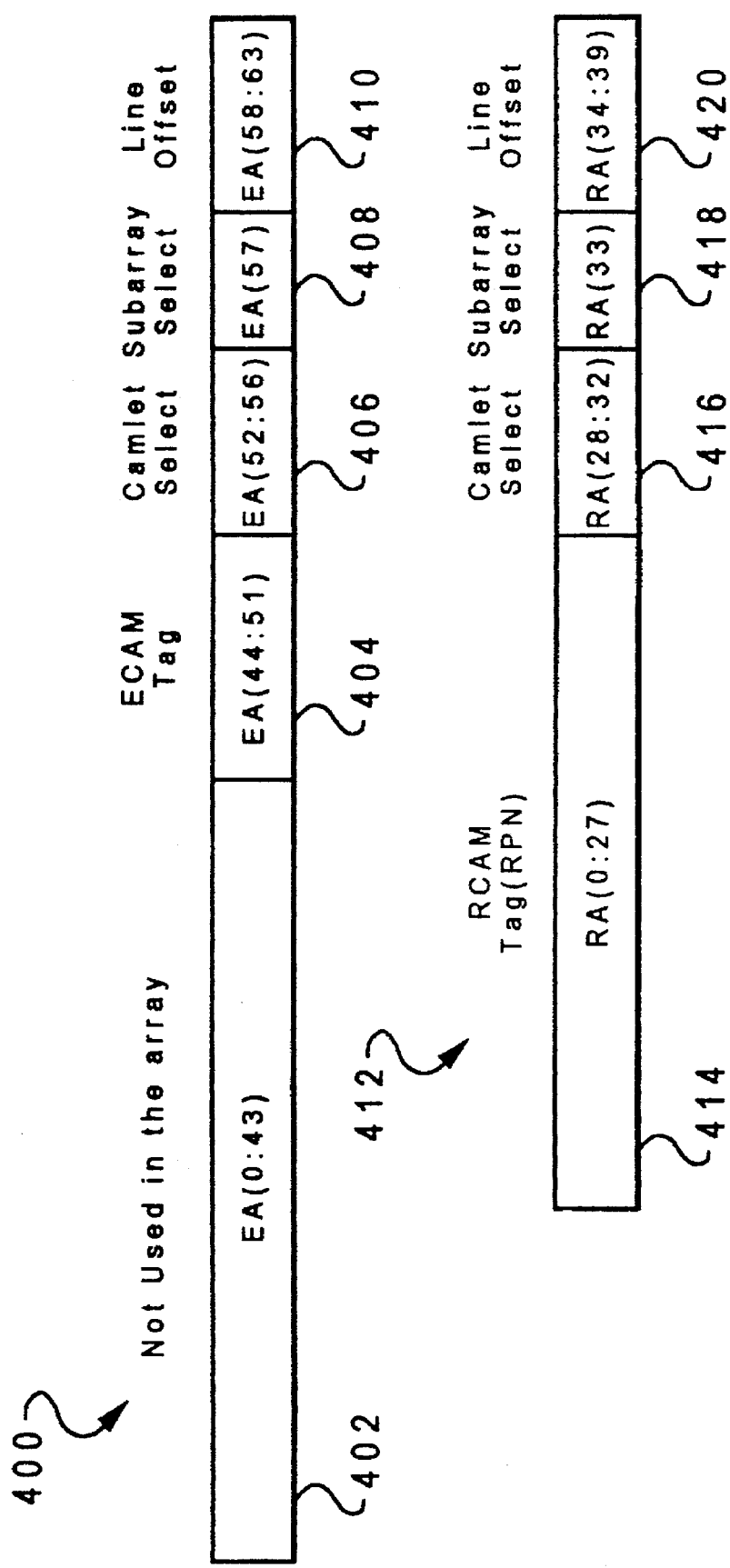
FIG. 4 is a graphic illustration of an addressing scheme utilized within the system of the present invention.

Referring now to FIG. 4, there is depicted a graphic illustration of an addressing system which may be utilized within the system of the present invention. As illustrated, an effective or virtual address 400 is graphically depicted within FIG. 4. Effective address 400 preferably includes 64 bits; however, bits 0 through bit 43 are not utilized within the data cache array of the present invention. As depicted, bits 58 through 63, as illustrated at 410, represent the line offset of the effective address. Bit 57, as depicted at 408, is utilized to select one of two subarrays within the data cache array of the present invention. Next, bits 52 through 56, as depicted at 406, are utilized to select one of 32 camlets within each subarray of the data cache array of the present invention. In the depicted embodiment of the present invention each "camlet" comprises eight lines of the data cache array, which are laid out in a manner which will be explained in greater detail herein. Finally, eight bits of the effective address, bits 44 through 51, as depicted at 404, form a content addressable memory field referred to herein as the "ECAM" tag present within each line of the data cache array provided in accordance with the present invention.

Next, as depicted at block 412, an exemplary real address which may be utilized with the system of the present invention is depicted. As above, six bits, bits 34–39, as illustrated at 420, are the line offset for the real address. Bit 33, as depicted at block 418, is utilized to select one of the two subarrays within the data cache array of the present invention and, five bits, bits 28–32, as illustrated at 416, are utilized to select a particular one of the 32 camlets within each subarray. Finally, as depicted at 414, 28 bits of the real address for an associated block of information are stored within a second content addressable field, referred to herein as "RCAM". Although not described herein in detail, those skilled in the art will appreciate that during any comparison between a desired address and the potions of the address stored within the ECAM field and the RCAM field, the bits identifying the camlet must also be compared.

Thus, those skilled in the art will appreciate that in accordance with the addressing system depicted within FIG. 4, each block of information within a system which incorporates the data cache array of the present invention will include two separate and distinct content addressable fields which may be utilized in conjunction with either a portion of the effective address or a portion of the real address to select a block of information within the cache array.

Figure 5:
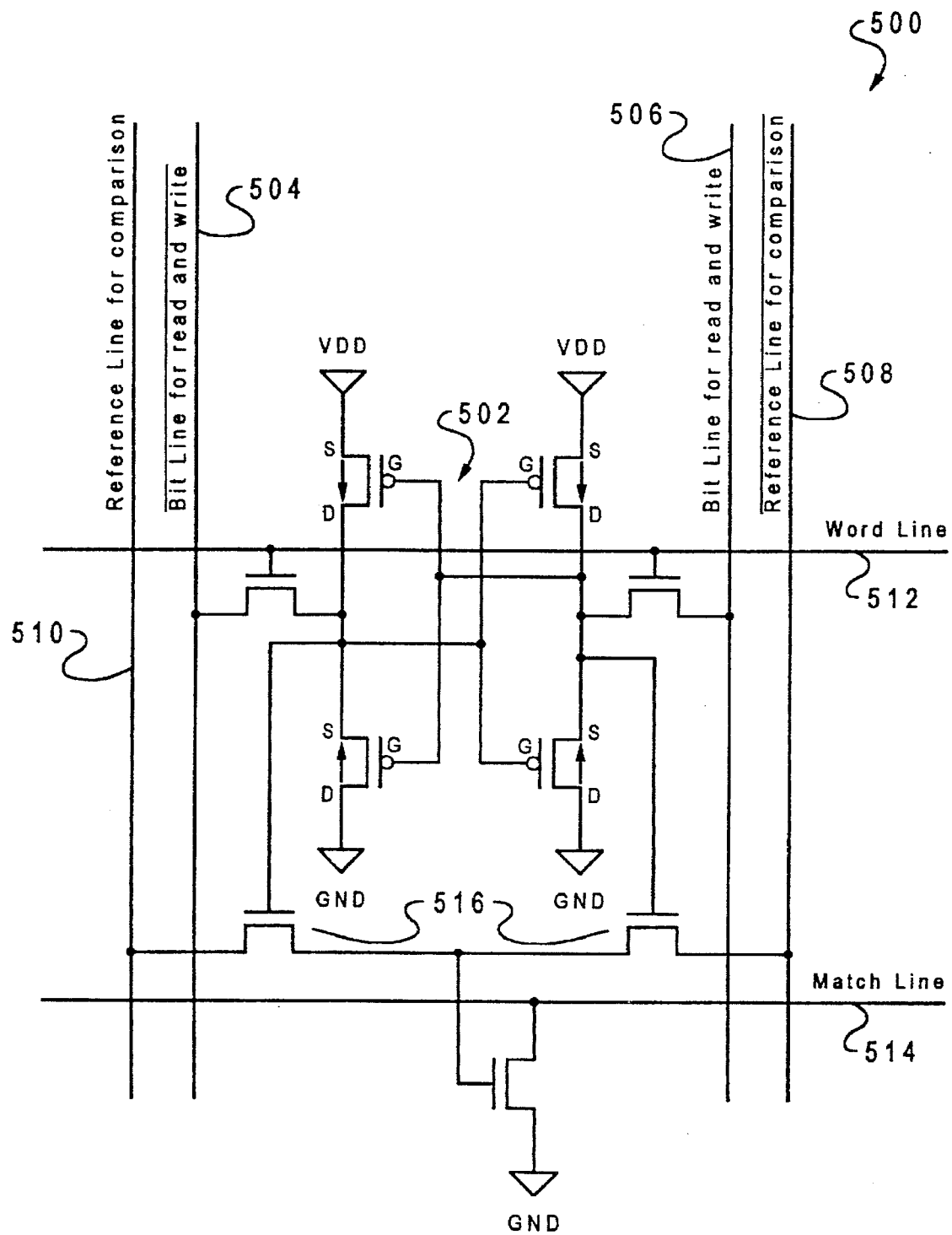
FIG. 5 is a schematic electrical circuit diagram of an exemplary CMOS CAM cell.

With reference now to FIG. 5, there is depicted a schematic electrical circuit diagram of an exemplary CMOS CAM cell provided in accordance with the present invention. As illustrated generally at 500, the CAM cell depicted includes a six transistor SRAM memory cell, generally indicated at 502, with additional logic for comparison, and XOR function, generally indicated at 516. The SRAM memory cell is preferably connected to a pair of bit lines 504 and 506 by activation of the word line 512. The two inputs of the XOR logic are preferably connected to a reference line pair 508 and output to a match lines 14. In accordance with the system of the present invention utilizing both a bit line pair 504 and 506 and a reference line pair 508 and 510 within selected CAM cells make it possible to compare and read/write during the same clock cycle.

In operation, reference line pair 508 and 510 are forced low and match line 514 is precharged high. Next, one of the reference lines (508 and 510) is activated and the comparison begins. If the data on the reference line does not match the data stored within the memory cell, the match line 514 will be discharged. However, if the data on the reference line does match the data stored within the memory cell, match line 514 will remain in the precharged condition. The condition of match line 514 is preferably latched and the reading or writing of data may thereafter continue while the match line is in the precharged condition.

Figure 6:
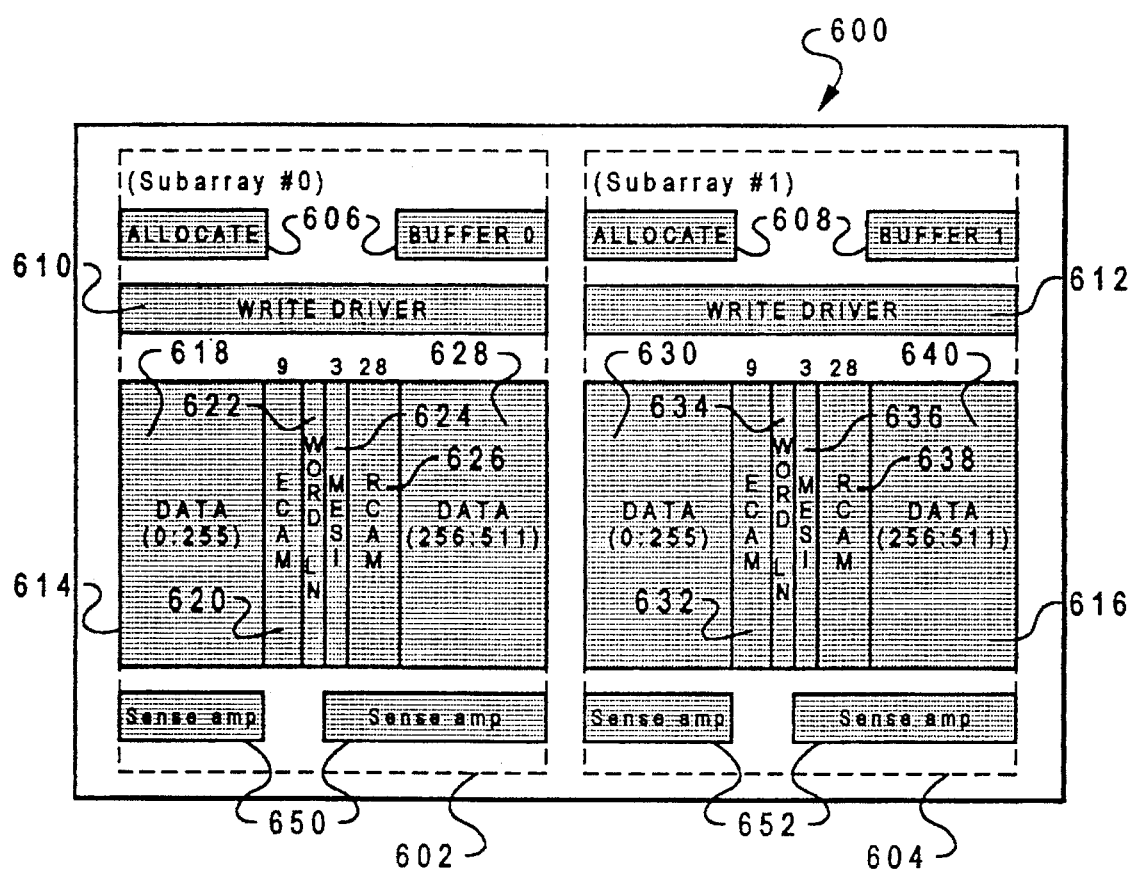
FIG. 6 is a high level block diagram of a multiple subarray cache provided in accordance with the present invention.

Referring now to FIG. 6, there is illustrated a high level block diagram of a multiple subarray cache 600 which is provided in accordance with the present invention. As illustrated, multiple subarray cache 600 preferably includes two subarrays 602 and 604; however, as those skilled in the art will appreciate upon reference to the present specification, a larger number of subarrays may be provided. As illustrated, data cache array unit 600 preferably contains 32K bytes of cache data and is physically subdivided into subarrays 602 and 604. Each subarray preferably includes 256 cache lines, wherein each cache line includes a 512 bit data field, which is broken into two segments, as depicted at 618 and 628 within subarray 602. Each cache line also preferably includes a 64 bit parity field (not shown) a 28 bit RCAM field 626, a 9 bit ECAM field 620 and a 3 bit MESI field 624.

As those skilled in the art will appreciate the so-called "MESI" status bits are commonly utilized within data caches. The term "MESI" is an acronym which stands for "Modified," "Exclusive," "Shared," and "Invalid."Thus, the status of data within a particular line within a data cache may be rapidly and efficiently determined by determining the status of these three bits. Similarly, the status of data within a cache may be altered by writing different bits into the MESI field.

Additionally, as depicted within FIG. 6, each subarray includes an associated allocate buffer 606 and 608 and an associated write driver 610 and 612 which am utilized to drive data into a cache line within the array. Similarly, sense amplifiers 650 and 652 are provided for amplifying the output signal from a particular cache line.

As illustrated within FIG. 6, by providing two separate and distinct content addressable fields within each line within the data cache array the data within that line may be accessed in a number of novel and efficient sequences.

Figure 7:
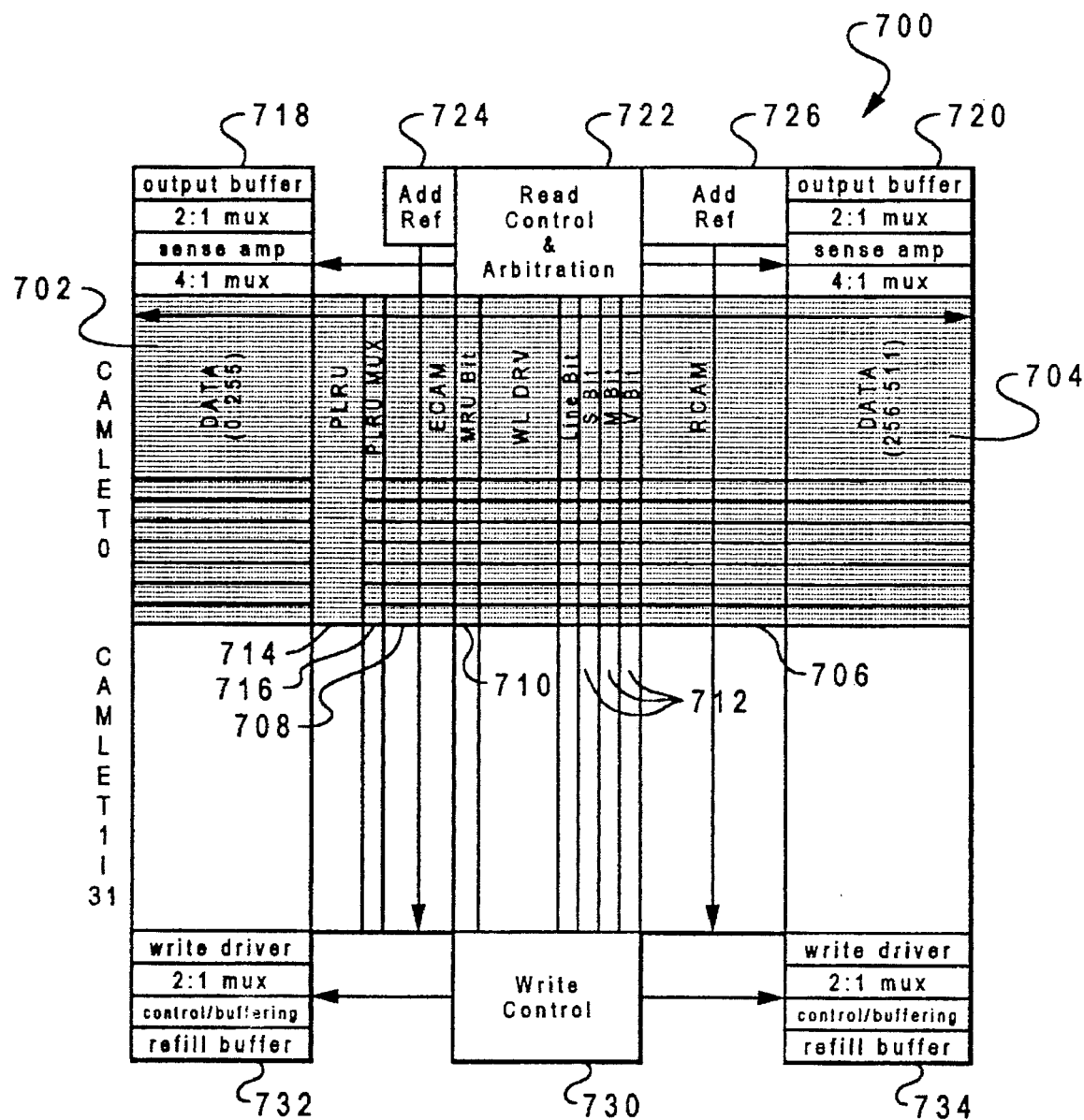
FIG. 7 is a more detailed block diagram of a single subarray of the cache of FIG. 6, illustrating one camlet in greater detail.

With reference now to FIG. 7, there is illustrated a more detailed block diagram of a single subarray of a cache provided in accordance with the present invention, illustrating one camlet in greater detail. As illustrated, a single subarray 700 is depicted. As described above, each line within subarray 700 includes 512 bits of data which is divided into data fields 702 and 704. A twenty-eight bit content addressable field containing a portion of a multibit real address (RCAM) is illustrated at 706 and an eight bit effective address content addressable field (ECAM) is depicted at block 708. An additional most recently utilized (MRU) bit 710 is depicted and this bit is utilized, in conjunction with eight bit ECAM content addressable field 708 to resolve offset situations in which two or more effective addresses map to a single real address.

The MESI bits are illustrated in greater detail at reference numeral 712 and, in accordance with an important feature of the present invention, a pseudo least recently utilized "PLRU" logic circuit is present within subarray 700 and is depicted at block 714. Each camlet, which comprises eight lines of data cache array 700, includes a separate PLRU logic circuit which may be utilized, in a manner which will be explained in greater detail herein, to allocate a particular line within that camlet for removal and replacement in the event of a cache miss and the requirement to load a new line of data.

A PLRU multiplexor is also illustrated at block 716 and is utilized, in a manner which will be explained in greater detail herein, to permit a particular line within a camlet to be allocated in response to a lack of validity of the data therein or in response to a utilization data which is determined utilizing PLU logic circuit 714.

Output buffers and sense amplifiers 718 and 720 are utilized in a conventional manner to read data from a cache line. In accordance with a novel feature of the present invention two input ports are provided within each subarray. An effective address (EA) input port and a real address (RA) input port are provided such that up to two concurrent accesses may be supported. Thus, one effective address (EA) port and one real address (RA) port may be utilized to simultaneously access the array during the same cycle. A read control and arbitration logic circuit 722 is provided to ensure that in the event simultaneous access of the same subarray is attempted utilizing the effective address (EA) port and real address (RA) port the lower priority cycle will be blocked and the higher priority cycle will be permitted to access the subarray. An exception to this technique is the so-called "SNOOP" cycle which, in a manner which will be explained in greater detail herein, is provided by implementing a second word line for access of the MESI bits, such that a SNOOP access may be run concurrently with any of the effective address (EA) cycles.

Finally, write control 730 is utilized in conjunction with write drivers and the associated multiplexes, as indicated at 732 and 734 to permit data within the data cache array to be written. Still referring to FIG. 7 it should be noted that since only a portion of the effective addresses utilized to try to obtain a match within an ECAM field on an initial cache look-up, it is possible to encounter a situation in which the portion of the effective address which it utilized indicates a "hit," but the data associated with that ECAM field is not the appropriate data. This situation is known as an address "offset" condition. This situation occurs wherein an entry within the cache includes the desired partial effective address; however, the real address of the data desired is not associated therewith.

Additionally, it is possible that although the portion of the effective address contained within the ECAM fields within the cache do not match the desired effective address upon initial look-up, the desired data may still be present within the cache. This is due to the fact that it is possible for two different effective addresses to map to the same real address. This situation is known as virtual address "aliasing."

These two situations may be efficiently handled within the data cache array of the present invention if the data cache array is constrained such that no two RCAM fields contain the same content within a selected camlet. This will ensure that only one line per camlet can match for a given address. As illustrated at reference numeral 710 a most recently utilized (MRU) bit may be stored as part of the ECAM field and utilized to permit two different ECAM fields to have the same stored address but only one of the ECAM fields to match. In other words, if there are multiple copies of the same ECAM address field stored within a camlet only the particular ECAM field having a validated MRU bit will be considered a match.

First, the so-called virtual "aliasing" miss will be described. In this scenario a partial effective address is utilized to access the content addressable field referred to as the ECAM, at reference numeral 708 and no stored ECAM field within the desired subarray and camlet matches the desired partial effective address. Thus, a second cycle real address look-up is required to determine if virtual aliasing has occurred.

During the period of time while the partial effective address is being utilized to determine if an ECAM field within the desired camlet is a match, the desired effective address is preferably being translated within the system into a real address by a memory management unit. Numerous schemes for translating effective addresses into real addresses are known in the prior art and further discussion of this technique is not contained herein. On the second cycle, the appropriate portion of the desired real address is utilized to attempt to locate a match within the content addressable fields (RCAM,) which contain the real address portion and a "hit" may occur, indicating an aliased address condition.

This result means that the requested data is contained within the selected camlet; however, the data was allocated into the cache utilizing a different effective address field than the effective address field which was utilized during the first cycle look-up. In this situation during the second cycle hit data and MESI status bits are returned to the load unit. In addition, while the line is selected the ECAM field associated with the desired data is updated with the portion of the effective address utilized during the initial look-up and the MRU bit for that line is set to "1", effectively turning this data cache line into a single cycle hit ,case for subsequent look-ups.

An offset hit scenario may also result. In such a situation the portion of the effective address utilized to access the ECAM field indicates a hit within the desired camlet; however, the real address portion stored within that line within the data cache array does not match the real page number which is output from the memory management unit after translation. At this point, it is determined that the data of interest is not stored within the line having the matching ECAM address; however, it is not yet known whether or not that data resides within any of the other camlet locations having different ECAM address fields. As above the RCAM content addressable fields within the camlet are then accessed utilizing a portion of the translated real address and a failure of the RCAM content addressable fields to hit indicates that the requested data does not reside within the selected camlet.

In this situation the MRU bit of the first ECAM field line must be reset, so that the ECAM field may be updated without creating a condition where two ECAMs have the same content within a camlet. In a third cycle the latched effective address is utilized to compare into the first line and that line's MRU bit is reset to zero. In the fourth cycle, an allocate cycle is performed which, in a manner which will be explained in greater detail herein, either utilizes the PLRU logic to select a line for replacement or determines an allocation candidate based on validity status, as determined utilizing the MESI bits. The desired data and its associated ECAM and RCAM fields is then written into the cache and the MRU bit for that line is set to "1". Thereafter, the desired data may be read from that line within the cache array.

Finally, an aliased hit may occur in an offset situation. In this scenario the portion of the effective address utilized to access the ECAM context addressable fields within a camlet indicates a hit but the real address portion stored therein does not match the real page number output from the memory management unit after translation. Again, at this point it is known that the data of interest is not stored within this particular line; however, again we do not know if the desired data resides within any other camlet location having a different ECAM address. In the second cycle, as described above with respect to the aliasing situation, the RCAM content addressable fields are examined for a match with the desired real address and a hit may occur, indicating that the requested data is present within the camlet but that the data has been allocated with a different effective address. In this situation the MRU bit of the first line is reset, and the ECAM field within the second line will be updated, this process occurs without creating a condition where two ECAMs have the same content with a camlet. The MRU bit is set to "1" and the desired data has then been returned from the cache.

Upon reference to the foregoing those skilled in the art will appreciate that by writing two separate and distinct content addressable fields within each cache line which may be utilized to access data within a cache line utilizing either the effective or real address, the data cache array of the present invention may be rendered substantially more efficient than fully associative cache designs while maintaining the high hit ratio of set associative cache designs known in the prior art.

Figure 8:
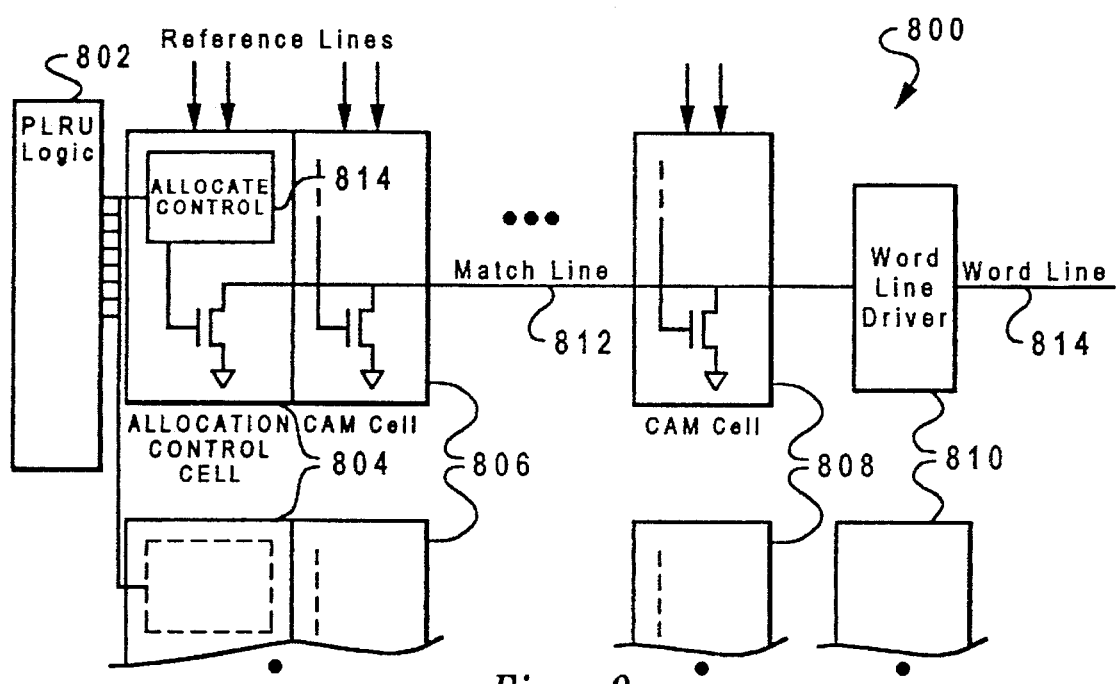
FIG. 8 is a high level block diagram illustrating a system for allocation control within a cache provided in accordance with the present invention.

Referring now to FIG. 8, there is depicted a high level block diagram illustrating a system for allocation control within a cache provided in accordance with the present invention. As depicted, a pseudo least recently utilized (PLRM) logic circuit 802 is provided for each camlet within the data cache array. Pseudo least recently utilized (PLRU) logic 802 is utilized to provide a series of signals to allocate control 814, which is utilized to control the conduction of a transistor which is coupled to a match line 812. As illustrated, a pseudo least recently utilized (PLRU) logic 802 is utilized to provide these control signals to each line within a camlet and thus, eight control outputs are provided.

As described above, match line 812 is preferably precharged and then discharged in response to a failure of the data stored within the cam cells (806, 808) to match a desired set of reference data.

As will be explained in greater detail herein, pseudo least recently utilized (PLRU) logic 802 may be utilized to select a particular line within a camlet for allocation based upon utilization data of those lines or, alternatively, based upon the validity status of a particular line within that camlet. In this manner, by providing allocation selection logic circuitry within the data cache array the selection of lines within the data cache array for replacement is greatly enhanced and bus loading is reduced, as well as reducing the number of cycles which are required to complete a miss sequence. This is accomplished, as will be described in greater detail herein, by providing an additional modified cell, an allocation control cell, within each ECAM field for each line within the data cache array. During the allocation cycle, pseudo least recently utilized (PLRU) logic 802 controls this additional cell while all ECAM reference line pairs are forced low, disabling their effect on the ECAM match line. This allows pseudo least recently utilized (PLRU) logic 802 to directly select a line for allocation and any other related miss sequence cycles.

For an instruction cache this approach may be utilized to merge both the allocation, line selection and refill cycles into a single cycle. For a data cache which may require copy backs of the replacement line, this approach can merge the allocation cycle, status/tag read cycle and the first copy back read cycle into a single cycle. The ECAM word line driver circuit previously necessary to update the ECAM field is also eliminated as the ECAM word line may be selected utilizing the same logic which selects the tag, status bit and data word lines. A single word line may thus be utilized to select every memory element (RCAM/ECAM/tag/status/data) within a cache line.

When a line within the data cache array needs to be replaced pseudo least recently utilized (PLRU) logic 802 first determines whether or not there is a non-valid line within the camlet which can be replaced. As those having ordinary skill in this art will appreciate, this is accomplished by checking the MESI bits for each line within the camlet. If all of the lines within the camlet are valid, pseudo least recently utilized (PLRU) logic 802 then utilizes a common PLRU mechanism to determine which line should be replaced. Seven binary bits within pseudo least recently utilized (PLRU) logic 802 are defined for each of the eight lines In the camlet. These bits are referred to as the PLRU bits and they are update for each hit within the data cache.

Thus, if the most recent access to the set was to line L0 line L1, line L2 or line L3, binary bit B0 is set equal to 1. If the most recent access to the set was to lines L4, L5, L6, or L7, the binary bit B0 is set equal to "0." Additionally, if the most recent access to lines L0-L3 was to L0, or L1, binary bit B1 is set equal to 1, otherwise binary bit B1 is set equal to 0. If the most recent access to lines L4-L7 was to L4 or L5, binary bit B2 is set equal to 1, otherwise binary bit B2 is set equal to 0. If the most recent access to lines L0-L1 was to L0, binary bit B3 is set equal to 1, otherwise binary bit B3 is set equal to 0. If the most recent access to lines L2-L3 was to L2, binary bit B4 is set equal to 1, otherwise binary bit B4 is set equal to 0. Similarly, if the most recent access to lines L4-L5 was to line L4, binary bit B5 is set equal to 1, otherwise binary B5 is set equal to 0. Finally, if the most recent access to lines L6-L7 was to line L6, binary bit B6 is set equal to 1, otherwise binary bit B6 is set equal to 0.

Figure 9:
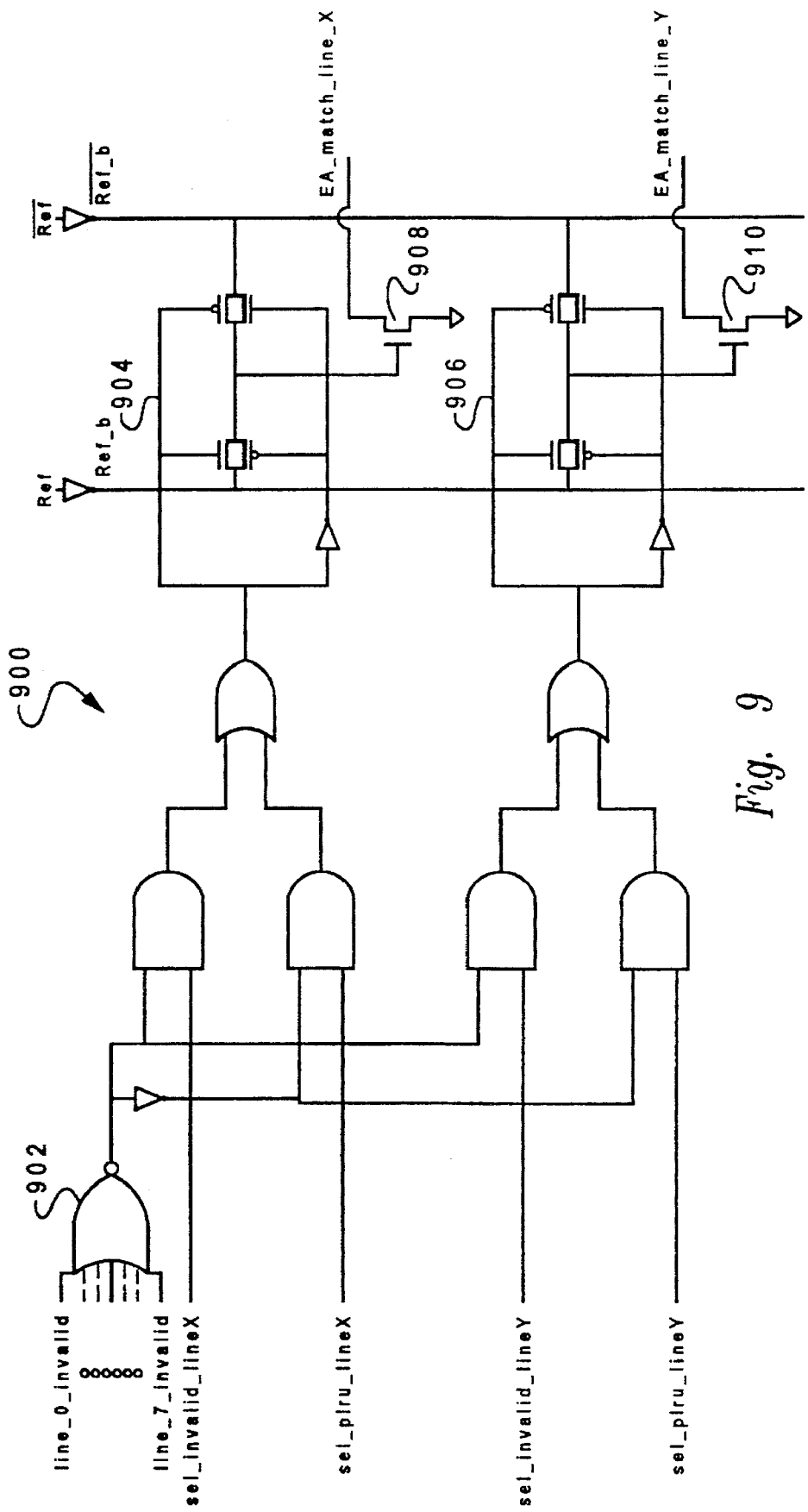
FIG. 9 is an illustrative logic circuit for implementing allocation control within a cache provided in accordance with the present invention.

In this manner, pseudo least recently utilized (PLRU) logic 802 may be utilized to select a particular line during an allocation in a cycle when all eight lines within a camlet are valid by following the following logic equations:

L0_selected:=^B0&^B1&^B3;
L1_selected:=^B0&^B1&B3;
L2_selected:=^B0&B1&^B4;
L3_selected:=^B0&B1&B4;
L4_selected:=B0&^B2&^B5;
L5_selected:=B0&^B2&B5;
L6_selected:=B0&B2&^B6;
L7_selected:=B0&B2&B6;

With reference now to FIG. 9, there is depicted an illustrative logic circuit for implementing allocation control within a data cache array provided in accordance with the present invention. As illustrated, a signal indicating that a particular line within a camlet is invalid may be coupled to logic gate 902 and utilized to enable the selection of the invalid line for an allocation cycle. Alternately, a particular line selected by pseudo least recently utilized (PLRU) logic 802 may also be utilized to select a particular line within a camlet for allocation. These signals are combined logically and coupled to allocation control cells 904 and 906, for illustrative purposes, and these circuits are then utilized, in the manner described above, to control allocation control transistors 908 and 910, which may be utilized to effect the selection of a particular line for allocation.

Figure 10:
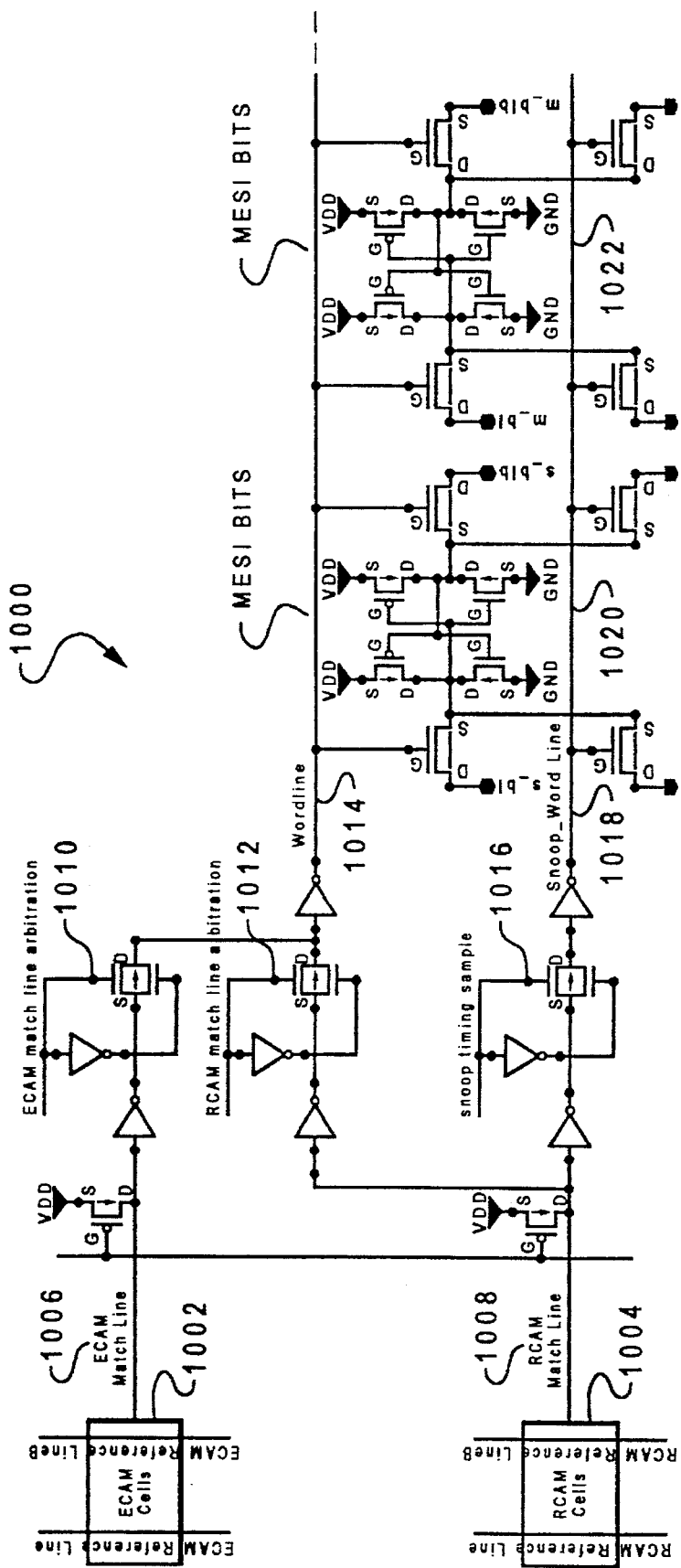
FIG. 10 is a schematic representation of a dual port concurrent access system for utilization within a cache provided in accordance with the present invention.

Finally, referring to FIG. 10, there is depicted a schematic representation of a dual port concurrent access within a data cache array provided in accordance with the present invention. As schematically depicted, ECAM cells 1002 and RCAM cells 1004 each drive an associated match line 1006 and 1008. Each match line is coupled to match line arbitration circuits 1010 and 1012. Thus, an attempted simultaneous access utilizing the EA port and RA port within the same subarray will result in an arbitration such that only a single word line 1014 is asserted. This ensures that concurrent access by both the EA port and RA port within the same subarray do not occur.

However, if the RA access port is being utilized to permit a "SNOOP" access a second word line may be activated. Thus, SNOOP word line 1018 may be activated directly from RA match line 1008 without regard to arbitration, permitting the RA input port to be utilized for a SNOOP access, while the EA input port is being utilized for normal loads or cache control operations. SNOOP word line 1018 may then be utilized to determine the state of data within a particular line by examining the MESI bits, two of which are illustrated at 1020 and 1022. The CAM cells which provide these bits are dual ported in nature, utilizing two word lines to allow each bit to be read simultaneously on two sets of bit lines.

The "normal" word line, as illustrated at 1014 may be activated by allowing the EA match line to be passed to the word line through an arbitrated pass device. This of course requires that RA match line 1008 is not being utilized to select the normal word line, as only one match line is permitted throughout the final word line buffer logic. In this manner, by providing a word line driver consisting of an EA input port/RA input port arbitrated match line selection path and a non-arbitrated RA input port match line selection path, concurrent access for SNOOP purposes may be provided.

While the invention has been particularly shown and described with reference to a preferred embodiment, it will be understood by those skilled in the art that various changes in form and detail may be made therein without departing from the spirit and scope of the invention.

We claim:

1. A data cache array comprising:
    a plurality of cache lines, each of said plurality of cache lines including:
    a selected block of information;
    a content addressable field, said content addressable field containing at least a portion of an address for said selected block of information;
    a match line coupled to said content addressable field;
    a data status field, said data status field including an indication of validity or invalidity of said selected block of information; and
    an allocation control cell coupled to said match line;
    a least recently utilized logic block within said data cache array for selecting and setting a particular allocation control cell in a selected cache line among a plurality of cache lines in response to an indication of invalidity of said selected block of information or in response to utilization of said plurality of cache lines wherein said match line is enabled for said selected cache line; and
    cache line allocation means for selecting a particular cache line among said plurality of cache lines for replacement in response to a state of said allocation control cell within said particular cache line.

2. The data cache array according to claim 1, wherein said match line is precharged prior to a cache cycle and said allocation control cell may be utilized to selectively discharge said match line within all cache lines within said plurality of cache lines except said particular cache line.

3. The data cache array according to claim 1, wherein said data cache array includes a plurality of congruence classes.

4. The data cache array according to claim 3, wherein each congruence class comprises a group of eight cache lines.

5. A data processing system comprising:
    a processor;
    a main memory store;
    a data cache array for temporarily storing blocks of information from said main memory store, said data cache array comprising:
    a plurality of cache lines, each of said plurality of cache lines including:
    a selected block of information;
    a content addressable field, said content addressable field containing at least a portion of an address for said selected block of information;
    a match line coupled to said content addressable field;
    a data status field, said data status field including an indication of validity or invalidity of said selected block of information; and
    an allocation control cell coupled to said match line;
    a least recently utilized logic block within said data cache array for selecting and setting a particular allocation control cell in a selected cache line among a plurality of cache lines in response to an indication of invalidity of said selected blocks of information within a cache line or in response to utilization of said plurality of cache lines wherein said match line is enabled for said selected cache line; and
    cache line allocation means for selecting a particular cache line among said plurality of cache lines for replacement in response to a state of said allocation control cell within said particular cache line.

6. The data processing system according to claim 4, wherein said match line is precharged prior to a cache cycle and said allocation control cell may be utilized to selectively discharge said match line within all cache lines within said plurality of cache lines except said particular cache line.

7. The data processing system according to claim 5, wherein said data cache array includes a plurality of congruence classes.

8. The data processing system according to claim 7, wherein each congruence class comprises a group of eight cache lines.

9. A method for cache line allocation within a data processing system, said method comprising the steps of:
    providing a data cache array having a plurality of groups of cache lines;
    within each cache line:
        storing a selected block of information;
        storing at least a portion of a multi-bit address for said selected block of information within a content addressable field;
        coupling a match line to said content addressable field; and
        storing an indication of validity or invalidity of said selected block of information within a data status field;
    providing an allocation control cell within said data cache array coupled to a match line within each cache line;
    altering the state of each allocation control cell within a group of cache lines in response to an indication of invalidity of said selected blocks of information within a cache line or in response to utilization of said group of cache lines wherein said match line is enabled for a selected cache line; and
    selecting a particular cache line among said group of cache lines for replacement in response to a state of said allocation control cell within said particular cache line.

10. The method for cache line allocation according to claim 9, wherein said step of storing at least a portion of a multi-bit address for said selected block of information within a content addressable field comprises the step of storing eight bits of an effective address for said selected block of information within a content addressable field.

* * * * *

UNITED STATES PATENT AND TRADEMARK OFFICE
CERTIFICATE OF CORRECTION

PATENT NO. : 5,668,972
DATED : Sep. 16, 1997
INVENTOR(S) : *Liu et al.*

It is certified that error appears in the above-indentified patent and that said Letters Patent is hereby corrected as shown below:

On cover page, item [73], add a second
Assignee: "Motorola, Inc., Schaumburg, IL."

Signed and Sealed this

Twenty-first Day of April, 1998

Attest:

BRUCE LEHMAN

*Attesting Officer*  *Commissioner of Patents and Trademarks*